July 17, 1928.
G. C. SNYDER
1,677,736
METHOD OF AND MACHINE FOR APPLYING MINOR MEMBERS TO SHEET ARTICLES
Filed Aug. 28, 1925
9 Sheets-Sheet 4
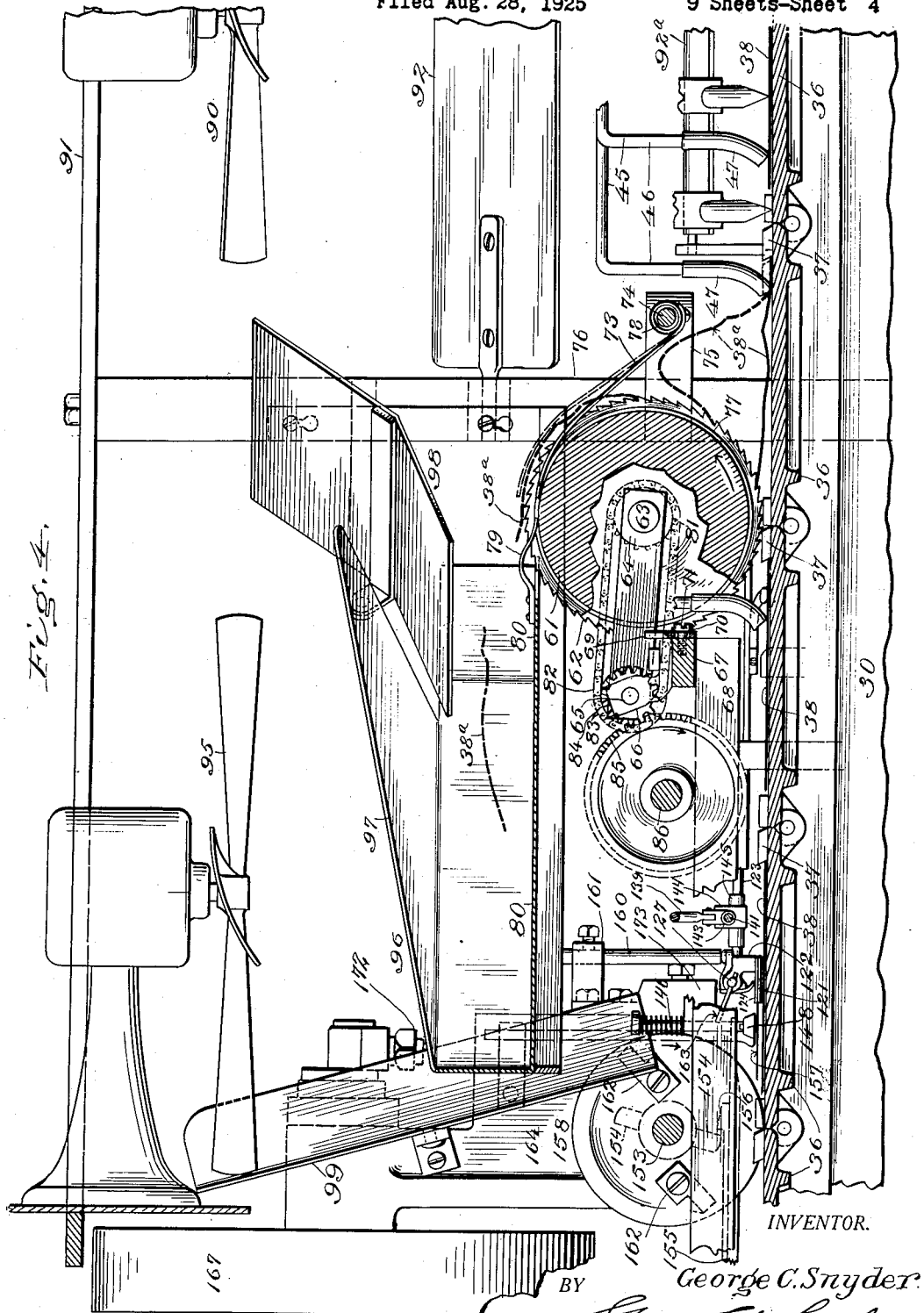
INVENTOR.
George C. Snyder
BY
ATTORNEY.

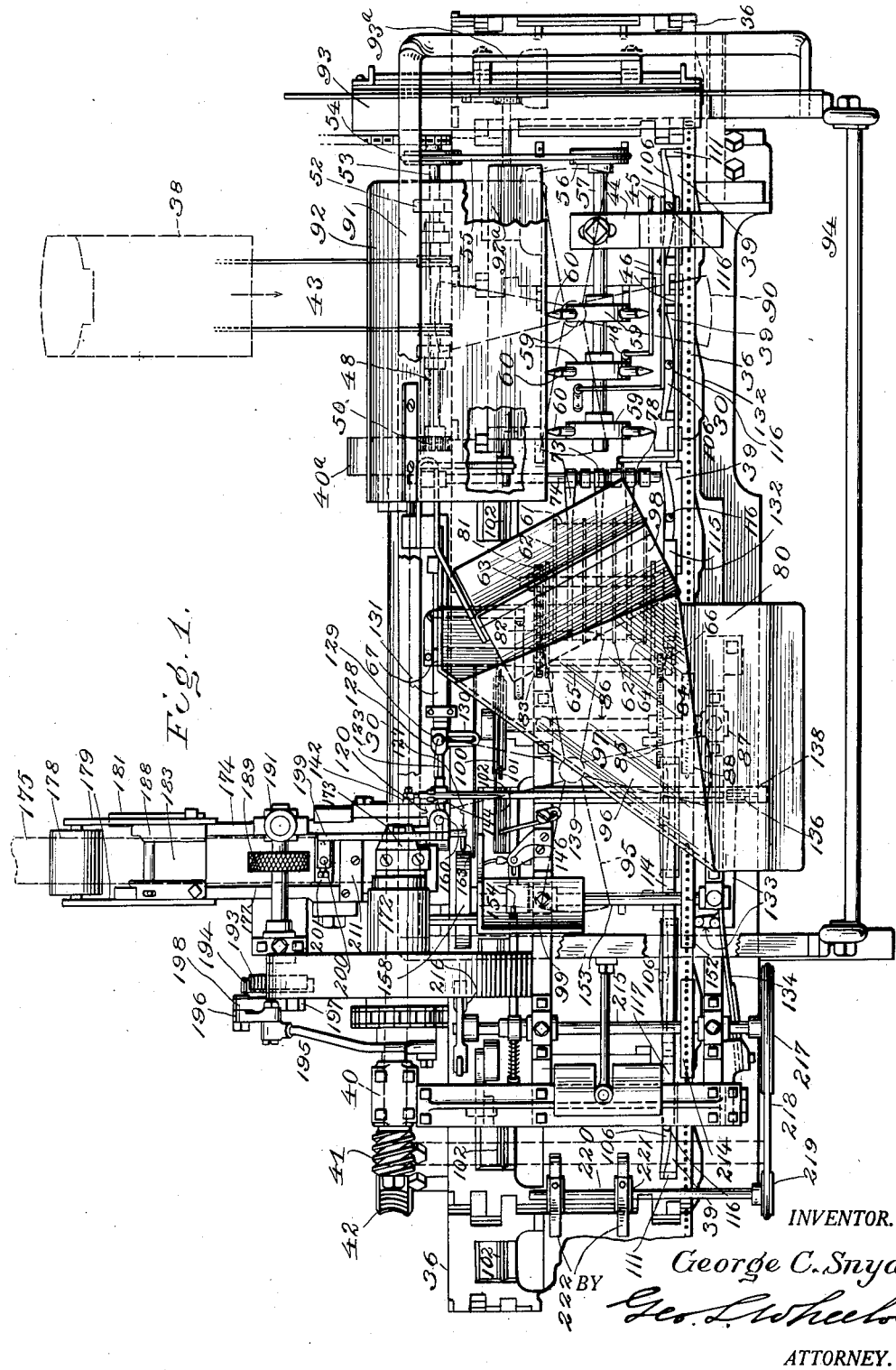

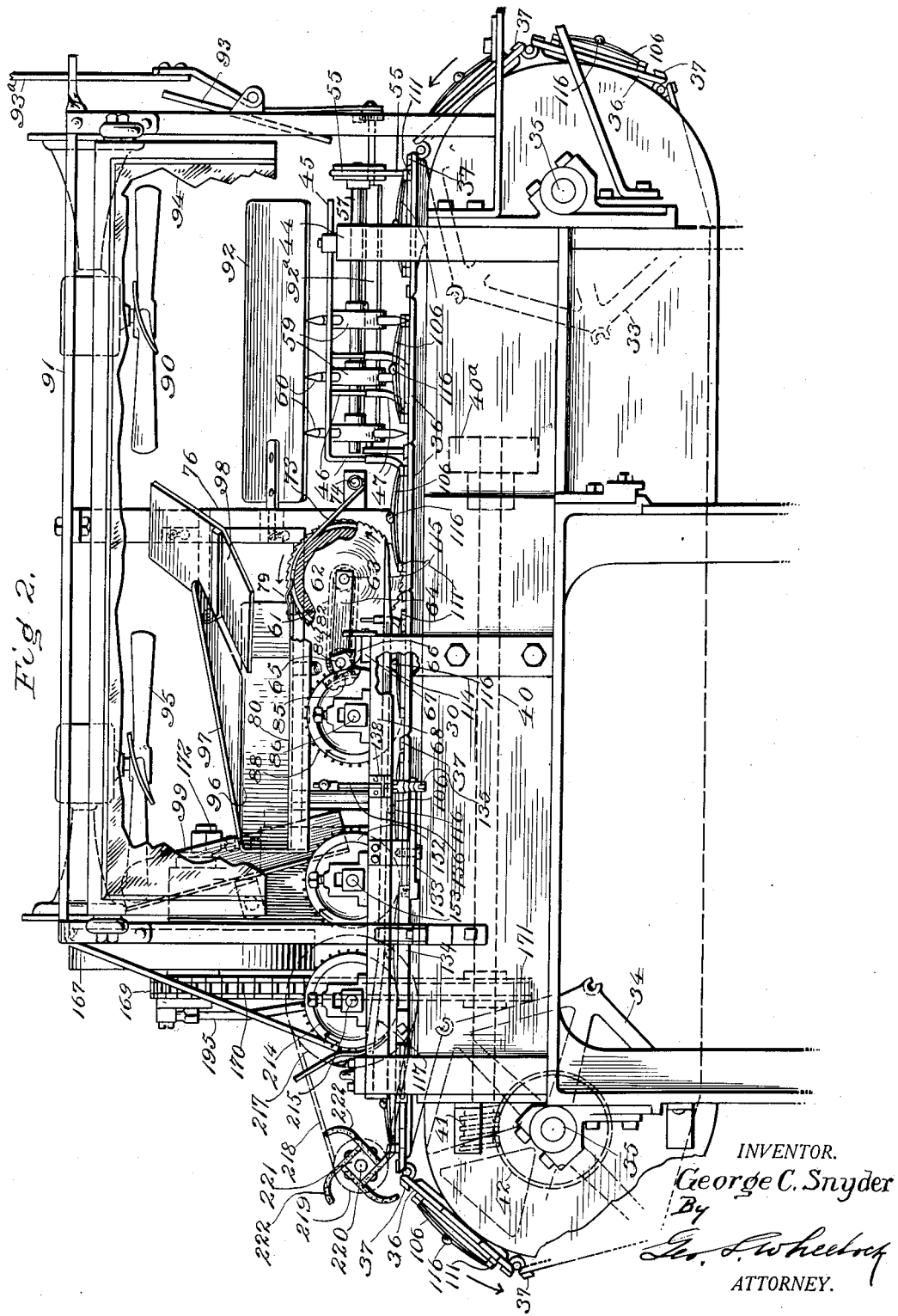

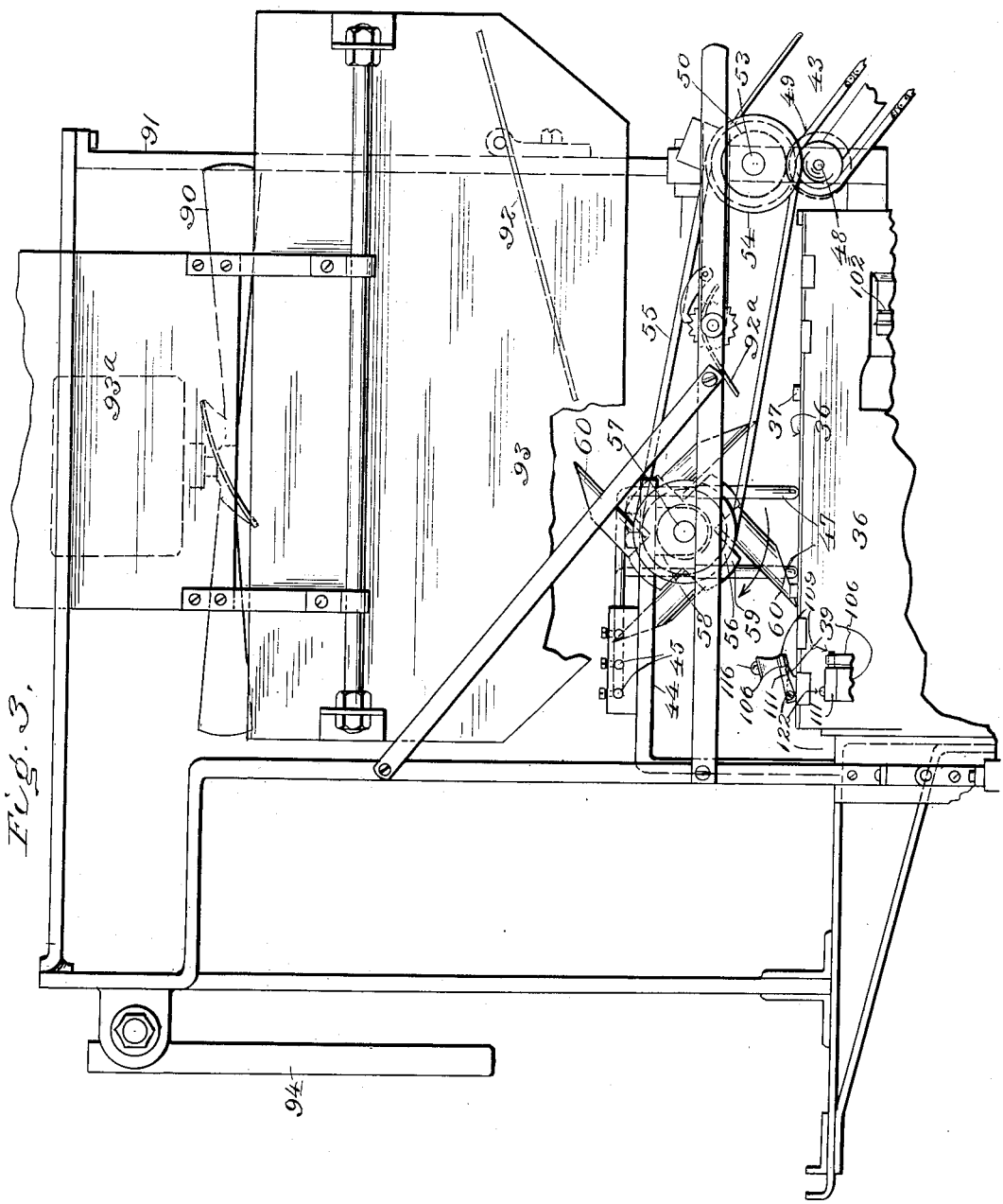

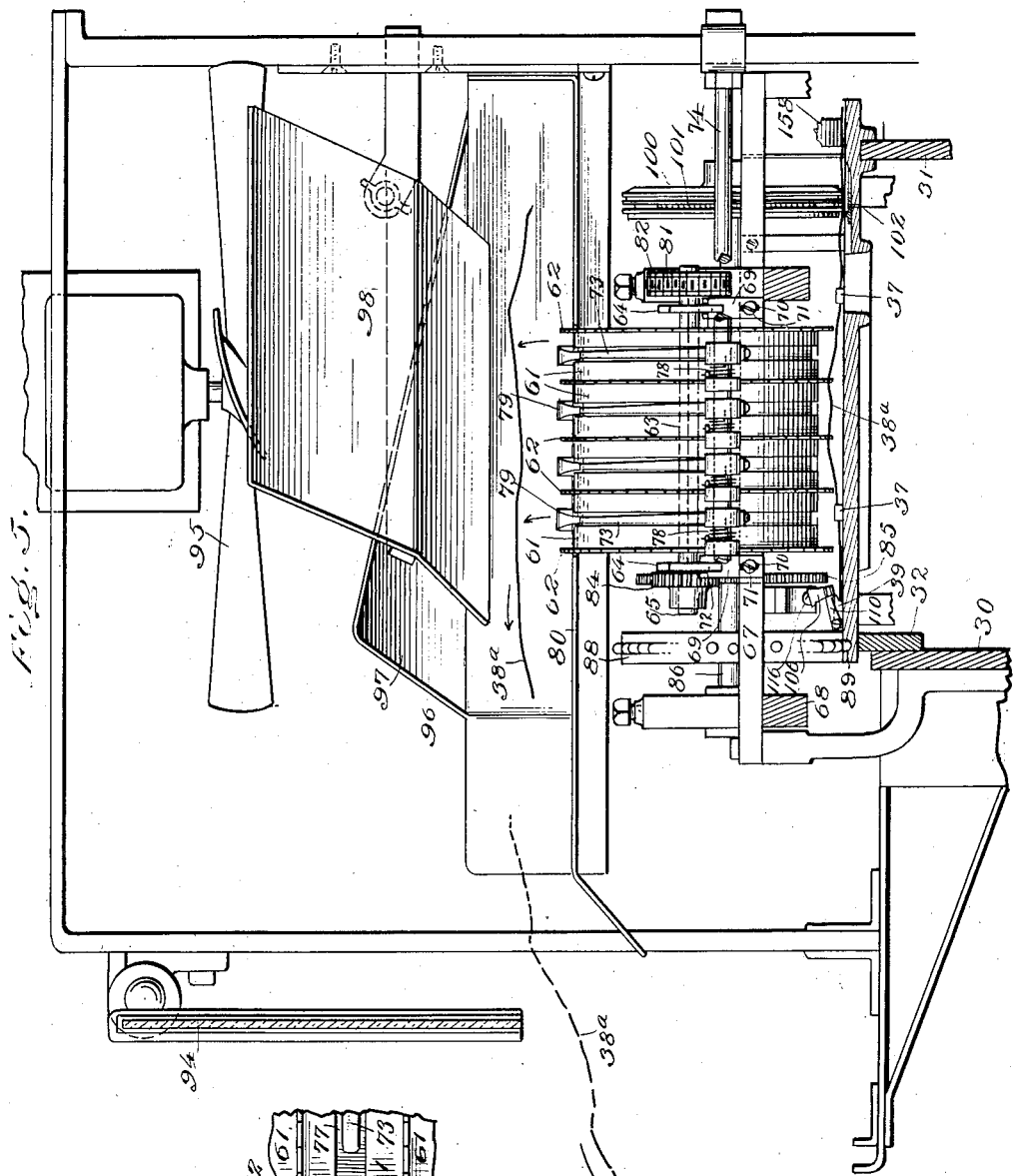

July 17, 1928. 1,677,736
G. C. SNYDER
METHOD OF AND MACHINE FOR APPLYING MINOR MEMBERS TO SHEET ARTICLES
Filed Aug. 28, 1925 9 Sheets-Sheet 6
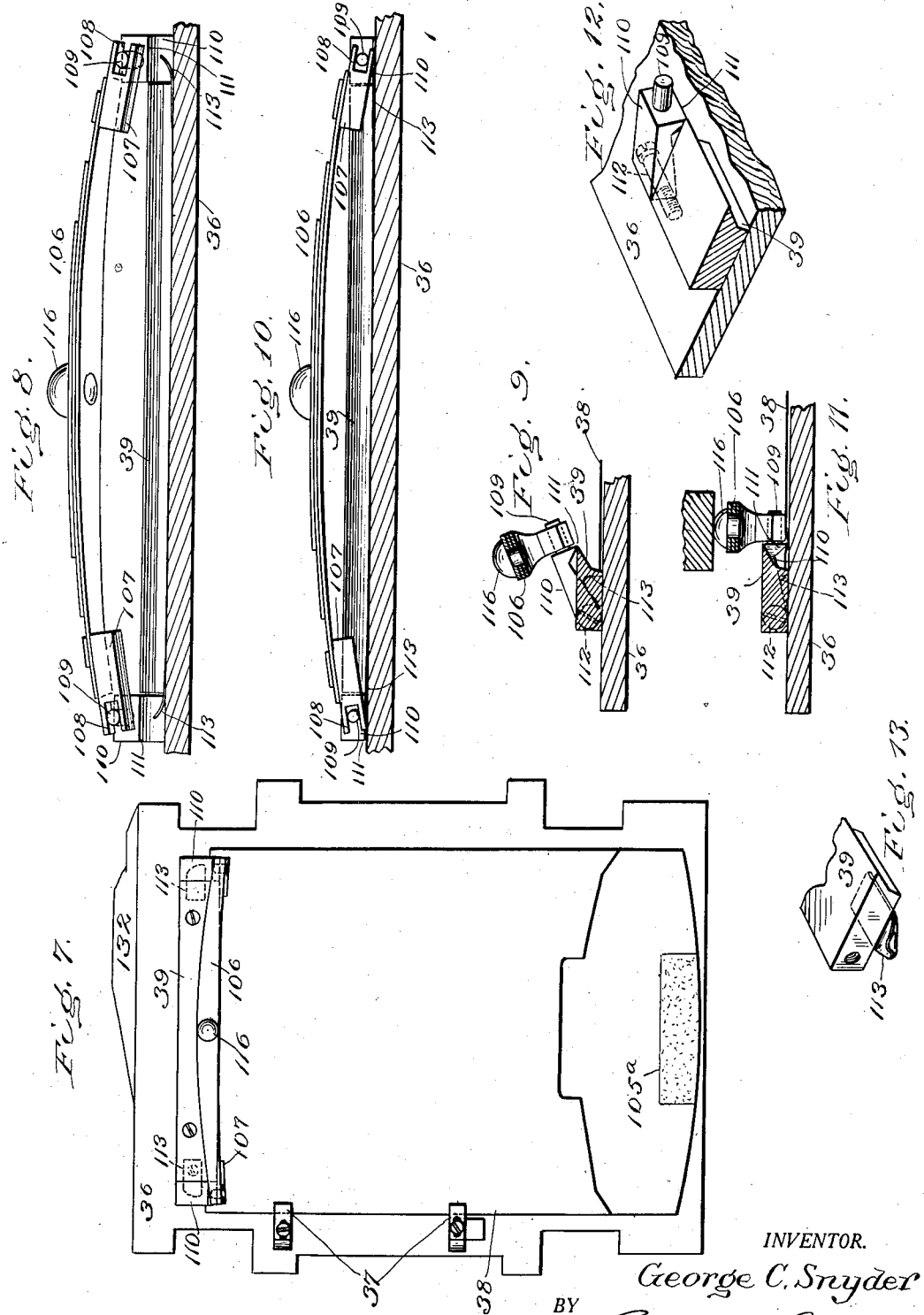
INVENTOR.
George C. Snyder
BY
Geo. L. Wheelock
ATTORNEY.

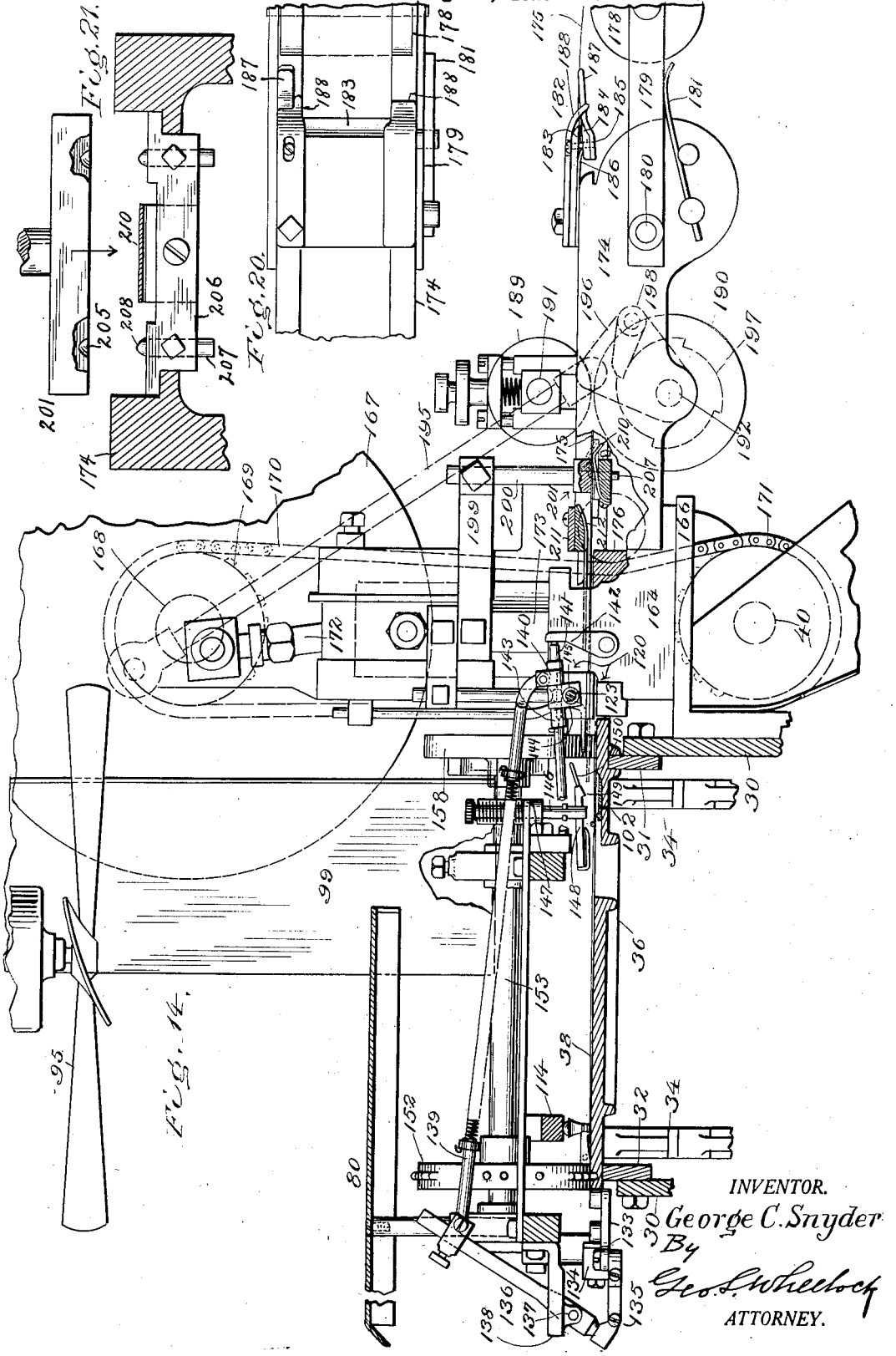

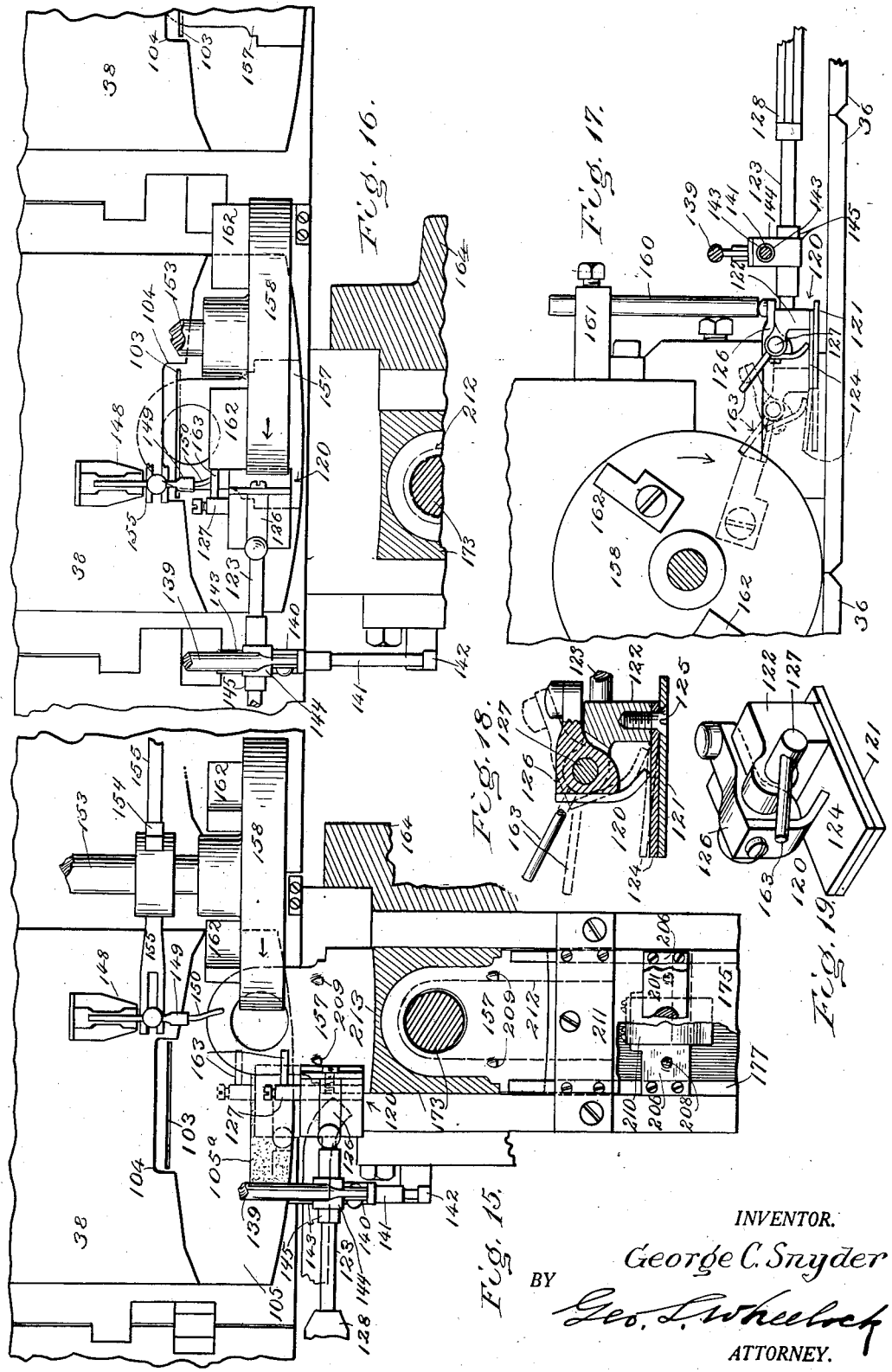

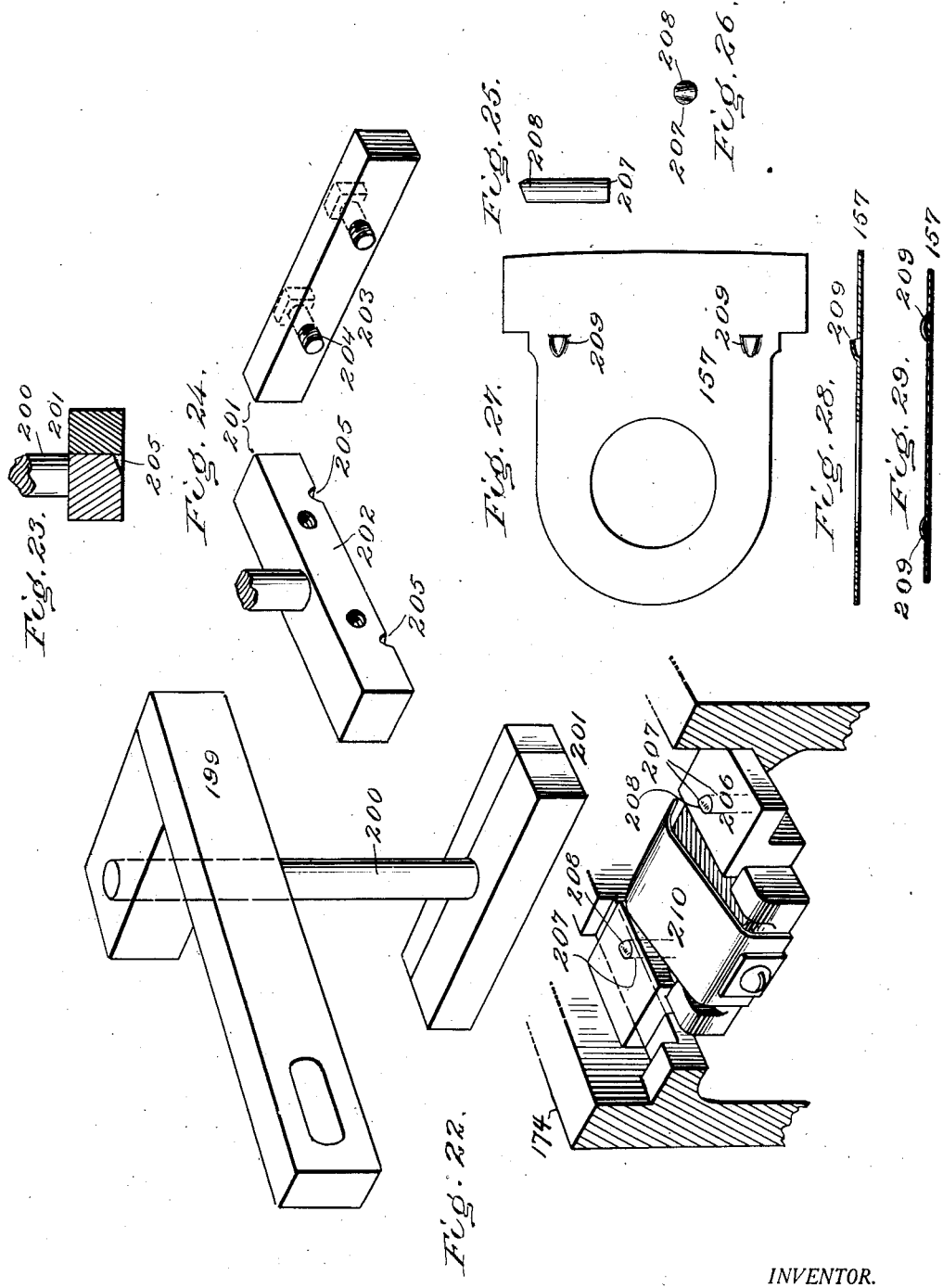

Patented July 17, 1928.

UNITED STATES PATENT OFFICE.

1,677,736

GEORGE C. SNYDER, OF NEW YORK, N. Y., ASSIGNOR TO KAELMA MANUFACTURING COMPANY, INC., OF NEW YORK, N. Y., A CORPORATION OF NEW YORK.

METHOD OF AND MACHINE FOR APPLYING MINOR MEMBERS TO SHEET ARTICLES.

Application filed August 28, 1925. Serial No. 53,056.

In the machine forming the subject matter of my previous application 741,180, filed October 2, 1924, no provision was made for discarding defective envelopes delivered from the machine which makes the envelope bodies. It sometimes happens that an envelope body-making machine turns out envelopes which are defective in the sense that they are not delivered in a more or less uniformly flat condition, that is, they do not, or they are so rumpled that they cannot, always lie substantially flat when delivered to my machine above mentioned. If such, or otherwise, defective envelope were delivered to a machine, such as my said prior machine, it is possible that it might fail to attach or properly attach a minor member to an envelope, or the defective and disqualified envelope might act to clog up said machine so that it would have to be stopped and sufficient time would have to be taken to clear the machine of a number of rumpled envelopes besides the envelope which occasioned the difficulty, thus interrupting the continuous progress of qualified envelopes in the machine. In the description the term "minor member" is employed to distinguish that feature from the envelope or other major member to which the minor member is to be applied.

Therefore, one of the objects of the present invention is to provide a detector-discarder to detect and discard any disqualified envelope or sheet article which is liable to occasion difficulties before mentioned, and to finish only the qualified envelopes or sheet articles to which minor members may be reliably applied. The expected trouble will not necessarily happen, although it may be caused by envelopes made by the best of envelope body-making machines, so that it is preferred under the present invention to take the precautionary measures referred to. The detector-discarder may be likened to an immigrant bureau which refuses to admit undesirables or disqualified persons into the country.

Other objects of the invention are to appropriately position or properly gage and register each envelope or sheet article on the moving platen which is to carry it; to produce special handles which are well adapted for use on envelopes so as to produce handle envelopes as covered, for example, by my application Serial No. 752,667, filed November 28, 1924; and generally to improve machines such as shown and described in my first mentioned application.

The invention consists generally, but in part only, of a method including moving individual sheet articles, flattening those articles which are qualified for use in a subsequent operation, and removing those articles which are not flattened and are disqualified for use. The invention also comprehends the combination of means for feeding articles, means for detecting disqualified articles, and means to forcibly engage the edges of and thereby to separate and discard, the disqualified articles.

The above recited objects being among the objects of the present invention, the invention consists of certain features of construction and combinations of parts together with certain methods to be hereinafter described and then claimed with reference to the accompanying drawings illustrating a suitable embodiment of the invention, and in which Fig. 1 is a plan of the improved machine;

Fig. 2 is a side elevation of the machine, parts being broken away;

Fig. 3 is an enlarged elevation of the receiving end of the machine;

Fig. 4 is an enlarged section longitudinally of the machine illustrating mainly the detector-discarder;

Fig. 5 is a transverse section partly in elevation of the detector-discarder;

Fig. 6 is a detailed view of portions of the detector-discarder;

Fig. 7 is a plan of one of the platens showing how an envelope is supported thereon;

Figs. 8 and 9 are respectively a sectional elevation and a transverse section of the means for clamping an envelope on a platen, such means being shown in released position;

Figs. 10 and 11 are similar views corresponding to Figs. 8 and 9 respectively except that the clamping means are shown as holding an envelope on a platen;

Figs. 12 and 13 are perspective views illustrating different details of the clamping means;

Fig. 14 is a transverse section of the machine to illustrate certain details connected with the gripper for minor members and also illustrating an elevation of the strip feeding and punching mechanism for forming the minor members;

Fig. 15 is a sectional plan illustrating the minor member gripper in position for receiving a minor member from the punching mechanism;

Fig. 16 is a somewhat similar view but illustrating the minor member gripper in the position in which it is released from a minor member after the minor member has been applied to an envelope;

Fig. 17 is a detail elevation illustrating the means for closing the gripper and the means for opening the gripper;

Fig. 18 is an enlarged sectional elevation of the minor member gripper, showing it in closed position in full lines and in open position in dotted lines;

Fig. 19 is a perspective view of such gripper;

Fig. 20 is a plan, illustrating details of the adjustable guide for the strip of relatively stiff paper which is to form the handles or minor members;

Fig. 21 is a sectional elevation illustrating the die and punch means for striking out shoulders in the strip of paper;

Fig. 22 is an enlarged perspective view illustrating more clearly the said die and punching means;

Fig. 23 is a transverse section of the die;

Fig. 24 is a perspective view to clearly illustrate the construction of the die;

Fig. 25 is a side elevation of one of the punches to co-operate with the die;

Fig. 26 is an end elevation of said punch; and

Figs. 27, 28 and 29 are respectively a plan, a longitudinal section and transverse section of the complete handle or minor member, to show the construction and arrangement of the shoulders which are struck up therefrom.

*Article conveying mechanism.*

This mechanism is substantially the same as disclosed by my prior application Serial No. 741,180, but will be briefly described with reference to Figs. 1 and 2. The machine is provided with framing 30, having a pair of parallel track-rails, 31, 32 (Fig. 5). Sprocket-wheel 33, 34 are fixed on transverse shafts 35 which are journaled in the frame 30. The links 36 of the endless sprocket-chain which is guided on the wheels 33, 34 constitute platens. These are also shown in Figs. 4 and 5 and others. The endless chain of platens moves in the direction of the arrows Fig. 2. The receding edge of each link-platen 36 is provided with under-cut gage lugs 37 which are adapted to engage the corresponding edges of the envelopes 38 delivered to the platens. The envelopes 38ᵃ are assumed to be defective and the mechanism for eliminating the defective envelopes is shown in Figs. 4, 9 and others, and will be later described. At the far end of each platen there is an undercut gage 39. With the inner edges of the gages 37 and 39, the envelopes delivered to the platens are brought in contact, at two adjoining edges of each envelope, by suitable positioning means to be described.

The machine is provided with a main power-shaft 40 which extends parallel with the machine and is provided with a worm 41 which is in mesh with worm-wheel 42 on the shaft 35 at the discharge end of the machine. The power-shaft 40 may be driven in any suitable manner as by a pulley 40ᵃ so that a continuous feed motion without halt may be imparted to the conveyor, which in the preferred form of the invention consists of an endless chain of platens.

In Fig. 1, there is conventionally indicated an elevator 43 for carrying the envelopes 38, for example, indicated in dotted lines Fig. 1, from any suitable envelope body-making machine which will continuously deliver envelope bodies successively to the platens of the machine of the present invention.

*Article positioning means.*

Means for appropriately conditioning and positioning articles, such as envelopes, are illustrated in Figs. 1 to 4 inclusive. A bracket 44 is mounted on frame 30 for supporting a number of parallel rods 45 which are located towards the far side of the machine with respect to the point of reception of the envelope bodies from the envelope body-making machine. These rods 45 extend substantially parallel with the direction of travel of the envelop conveyor, and are provided with down-turned ends 46. The down-turned ends 46 are adapted to receive flexible downwardly extending fingers 47 which preferably consist of sections of rubber tubing slipped on to the fingers 46. These flexible fingers are long enough so as to have a slight rearward dragging engagement with the envelopes delivered to the platens, and their tendency is to adjust the envelopes so as to cause their corresponding side edges to abut against and be registered with the gage-lugs 37.

At the reception side of the machine the shaft 48 of the elevator 43 drives, by means of a gear wheel 49 on shaft 48, a gear wheel 50 on shaft 53. The shaft 53 is mounted in suitable supports 52 above the plane of travel of the envelopes in the machine. Upon the shaft 53 there is a pulley 54 for a belt 55 which extends transversely of the machine and passes around another pulley 56 mounted on a shaft 57 above the link-platens. and which shaft extends in the direction of travel and parallel with the plane of travel of the envelopes in the machine. Said shaft 57 is supported in a hanger-bracket 59 mounted upon the supporting bracket 44.

Shaft 57 has secured thereto a number of hubs 59 on which are located outwardly extending flexible fingers 60, preferably of rubber tubing, which are long enough to slightly bear on the envelopes on the platen. Each hub 59 with its flexible fingers 60 constitutes a rotary pusher-wheel, the function of which is to cause the tip ends of the flexible fingers to bear on the envelopes so as to move them transversely of the line of travel of the platens and to cause the closed ends of the envelopes to be brought in contact with and to register with the gages 39.

It will be seen, therefore, that by means of the fixed flexible fingers 47 and the rotating flexible fingers 60 the rear edges of the envelopes and their closed ends are caused to be registered upon the platens, as it is necessary that the envelopes have an appropriate position thereon in order to properly perform the subsequent work on the envelopes.

*Detector-discarder.*

The means for detecting disqualified sheet articles or envelopes and discarding them from the machine are fully illustrated in Figs. 1, 2, 4 and 5. A suitable number of cylindrical sections 61 and circular toothed disks 62 are provided and these are arranged more or less in the form of a cylinder and rigidly mounted on shaft 63 which extends transversely of the machine over the advancing platens, along a line to the rear of the activities of the positioning fingers 47 and 60. Each toothed disk 62 is more or less like a circular saw and constitutes a rotary toothed detector. A number of these are preferred because of greater reliability in service.

The detector-discarder shaft 63 is mounted rotatably in the free ends of arms 64 which are pivoted on a transverse pivot-shaft 65 so that the arms together with the toothed disks, etc., may be adjusted about the pivot shaft 65 whenever desired. The shaft 65 is mounted upon supporting brackets 66 which are fixed to a transverse supporting bar 67 secured to the main frame of the machine by means of side-pieces 68, one at each side of the frame 30.

Rest members 69 are mounted on the bar 67 by a pin-and-slot connection at 70, which is provided by screws 71. The rest members 69 are therefore upwardly and downwardly adjustable and their upper ends are provided with notches 72 in which the detector discarder arms 64 are received. The rest members 69 thus provide lateral stabilizing means for the sections 61 and toothed disks 62, through the engagement of the arms with the notches, and the arms may be adjusted upwardly or downwardly for slight distances in order to regulate the size of the "throat", as it may be termed, between the toothed disks 62 and the upper surfaces of the platens, and through which the qualified envelopes pass.

The combined shaft 63 and cylinder, formed by cylindrical sections 61 and toothed disks 62, are caused to rotate in the direction of the arrow, and in front of them there is arranged a series of rearwardly extending guide-fingers 73 which are secured at their lower ends to a supporting member 74 mounted rigidly in brackets 75. Brackets 75 are located on their common upright frame members 76. The cylindrical sections 61 are provided with annular grooves 77 in which the free upper ends of the guide fingers 73 may rest normally, these fingers being held in the grooves 77 by means of actuating springs 78 which are coiled on the supporting member 74 and attached thereto. The terminals of the guide fingers 73 are preferably approximately in line with or a little back of the vertical dimensions of the combined cylindrical sections and toothed disks. Guide fingers 79 extend rearwardly from a platform 80 and their free ends are always engaged in the grooves 77, so that there is one set of fingers 79 which are always in the grooves and give lateral stability to the toothed-cylinder, and another set 73 pointing in opposite direction from the fingers 79 and which may be called upon to move from the full line position shown in Fig. 4 into the dotted line position.

The transverse shaft 63 is provided at one end with a sprocket-wheel 81 for a chain 82 which is adapted to drive wheel 81 from a rear sprocket-wheel 83, so that the toothed cylinder, or toothed disks etc., may have a continuous rotary motion in the direction of the arrow. The sprocket-wheel 83 is fixed on pivot-shaft 65 which is provided with a pinion 84 adapted to be driven by a large gear wheel 85 fixed on a shaft 86 that extends transversely of the machine. The shaft 86 is mounted in a bracket 87 fixed to the frame 30 of the machine and is provided with a toothed wheel 88 adapted to engage and be driven from the platens, which to that end are provided with driving holes or recesses 89 that receive the teeth of wheel 88.

From the above description of the detector-discarder, it will be apparent that if a rumpled or non-flattened envelope passes the positioning fingers 47 and 60, so that there is a disqualified envelope 38ª, the rearward feeding-movement of the platen carrying it will cause its forward edge to come into contact with the constantly rotating toothed detector 62 and the teeth thereof will forcibly engage the advance edge of the defective envelope which projects into the path of rotation of said teeth, and cause the disqualified envelope to be instantly carried upwardly to the guide fingers 73 which then move outwardly from grooves 77 and act to guide the disqualified envelope rearwardly of the position of the fingers 73, said fingers 73 also serving to hold the disqualified envelope in contact with the rapidly rotating detector which is discarding the envelope. The disqualified envelope is delivered towards and above platform 80, to be discharged from the machine, as hereinafter recited. The qualified envelopes, that is to say, those which are flattened, or flat enough, and properly registered by means of the flexible fingers 47 and 60, will be carried into and through the throat between the detector-discarder and the upper surfaces of the platens for subsequent work thereon, such as applying minor fastening members to the envelopes or sheet articles at a suitable location in the path of travel of the platens.

*Envelope flattening means.*

Means for positively flattening the envelopes and thus additionally conditioning them may not be necessary, as usually the envelopes which pass beneath fingers 47 and 60 and are not discarded, are sufficiently flat so as to pass through the throat below the detector-discarder. However, such means may at times be desirable as accessory to the positioning and registering means referred to and as accessory to the detector-discarder, and their use will largely depend on the perfection of the envelope bodies delivered to the machine and the character and stiffness of the paper, and which may be delivered in a condition, not so rumpled or out of the flat, that pneumatic flattening may be a possibility.

To that end pneumatic means are preferably provided, and in fact means of a pneumatic nature are best employed for the particular purpose of carrying away the disqualified envelope after it has been discarded by the detector-discarder. These means are shown in Figs. 1 to 5 inclusive. An electric fan 90 is supported, to turn in a horizontal direction, by means of a supporting member 91, carried by the frame 30. The fan 90 is sufficiently elevated above the path of travel of the envelopes in the machine so that suitable deflectors may be arranged under the fan for properly directing the downward currents of air. A deflector 92 is pivotally supported on one of the standards of the frame so that it may be adjusted as desired. This deflector extends inwardly over the flap-ends of the traveling envelopes, and an accessory deflector 92ª is also pivoted to the frame for desired adjustment relative to the envelopes, it being fairly close to the envelopes so as to suppress and control the downward draft within desired limits. A deflector 93 extends transversely of the machine at the end just back of the point of delivery of the envelopes to the machine, it being pivotally mounted so as to be adjustable horizontally. Its function is to confine the downward air currents and deflect them towards the envelopes which have just been deposited on the travelling platens. Above deflector 93 is another pivoted deflector 93ª which extends transversely of the machine. Pivotally mounted at its upper edge upon the superstructure of the machine there is a large deflector 94 which extends along the far side of the machine, and this deflector is preferably of glass so that the operator of the machine may see through it. This large deflector 94 tends to confine the air currents throughout substantially the length of the machine.

A second electric fan 95 is also supported by frame member 91 so as to turn in about the horizontal plane of rotation of the other fan 90. The fan 95 serves in part to direct downward air currents upon the envelopes at other parts of the machine than by fan 90.

The platform 80, before referred to, is partially enclosed by a cast-away box 96 which has an inclined top wall 97 below the fan 95 and constituting an air current deflector. The cast-away box 96 is open at the far side of the machine so that it will guide and permit the discharge of discarded envelopes from off the platform 80. Mounted with relation to the inclined, deflecting, top wall 97 is a pivoted adjustable deflector 98 which extends partly above and partly below the plane of inclined top wall 97, and it is spaced away therefrom sufficiently so that downward currents of air from the fan 95 are deflected under the inclined deflecting wall 97, and given a direction outwardly through the discharge opening in the cast-away box 96. The outwardly directed currents of air referred to serve to cause an outward suction between the lower portion of the deflector 98 and the top of the detector-discarder and the adjacent portion of platform 80, so that the disqualified and discarded envelopes 38ª will be sucked out and away from the detector-discarder and into the outwardly directed current of air from between the deflectors 97 and 98, and the disqualified envelopes will be thus forcibly blown away and ejected from the machine.

To the rear of the cast-away box 96, there is arranged another pivoted and adjustable deflector 99 underneath the fan 95, the function of which is to direct downward currents of air on to the flap-portions of the envelopes at the points where the minor members are to be applied thereto.

*Envelope slitting and gumming means.*

These features of the machine for conditioning the envelopes or sheets are shown in Figs. 1, 5, 15 and 16 and are more particularly described in my prior application No.

741,180. Shaft 86, before mentioned, carries a disk 100 on which there is supported a pair of slitters 101 adapted to cut transverse slits, or perforations, 103 in the flap carrying walls of the envelopes 38. To permit the perforating or slitting, the platens 36 are provided with transverse slots 102 into which the slitters may move to form the necessary cuts, the cutting being confined within the field of the notches 104, and produced in the back walls of the envelopes which are provided with closure-flaps 105. The shaft 86 may carry a gumming roll which receives gum from a suitable supply and is adapted to apply transverse stripes of gum $105^a$ to the inner surfaces of the flaps of the envelopes, so that the attaching portions of the minor members or handles may be subsequently pressed upon and caused to adhere to the flaps, as in my application just referred to. Or, the stripes of gum may be applied in the envelop body make machine.

*Envelope clamping means for securing envelopes to platens.*

These portions of the machine for conditioning envelopes or sheet articles are best illustrated in Figs. 1, 2 and 7 to 14 inclusive. The clamping of each envelope on to a platen takes place just after any disqualified envelopes may have been discarded and before subsequent work is performed on the envelopes 38 as by slitting or perforating. The clamping means are arranged at that end of each platen which is more distant from the point of delivery of the envelopes to the machine by the body-making machine. A bowed compound leaf-spring 106 is rigidly secured at both ends to end-pieces 107 so that the said spring and end-pieces extend transversely of each platen along a line just in advance of the undercut end-gage 39. End-pieces 107 are provided with slots 108 in which are received studs 109 which project inwardly from the envelope clamps 110. Envelope clamps 110 are arranged at both ends of the gage 39, and close thereto, and are provided with claws 111 that function to grip the closed ends of the envelopes just in advance of the gage 39. The clamps are mounted on pivot pins 112 which extend from the ends of the gage 39, so that the clamps may have an oscillatory motion. Between each platen and the clamps 110 thereon there are placed plate springs 113, the tendency of which is to raise the clamps away from the platen, to the position shown in Figs. 8 and 9.

Means are provided for actuating the clamps so as to clamp the envelope at the proper time and to release the clamps after the minor members have been attached to the envelopes. Such means preferably consists of a control bar or rail 114 which is fixed rigidly to the frame of the machine and extends longitudinally thereof from a point opposite the detector-discarder to the discharge end of the machine. The advance end of control bar 114 is provided with a clamp actuating, inclined or camming, portion 115 which, with the control bar, lies directly above the line of travel of the bowed springs 106 which operate the clamps. It will be seen from Fig. 2 that the camming end 115 of the control bar or control means bears upon knobs 116 secured to the backs of the spring contact member 106, causing each bowed spring coming under it to be successively flexed and the claws of the clamps to clamp the envelopes as shown in Figs. 10 and 11, the action being that an easy bearing of the clamps on the envelopes is possible by reason of the flexiblility of the bowed springs; that is to say, the bowed springs prevent a too hard pressure of the clamps upon the closed ends of the envelopes and take care of any unevenness and inequality between the parts, whereby injury to the envelopes is prevented although they will be held fast to the platens.

Clamp-control bar 114 is provided at its rear end with an inclined clamp-release portion 117 which is inclined in opposite direction to inclined portion 115 and is adapted to release the clamps from the envelopes after the minor members have been properly attached, so that the envelopes are free to be discharged at the rear end of the machine. Between the clamp actuating portion 115 and the clamp-release portion 117, the control bar serves to maintain the envelopes or sheets on the platens while work is being performed thereon.

*Handle gripping and advancing mechanism.*

This mechanism differs somewhat from that disclosed in my prior application No. 741,180. Only a portion of the complete mechanism is shown herein and so far as shown is illustrated in Figs. 1, 4 and 14 to 19 inclusive. As in the prior machine, the minor members, constituting fastening devices such as handles, are intermittently fed in the direction of travel of the articles or envelopes, without interrupting the continuous progress of the envelopes past the location where the minor members are applied. An intermittently operable gripper 120 for the minor members, such as handles, is provided and to it the minor members are delivered one at a time from the punching mechanism to be described. The gripper comprises a plate 121 which is rigidly fixed to the gripper-head 122 which is rigid on shank 123. The plate 121 constitutes a fixed jaw which is opposed by a plate 124 of spring metal, constituting a movable jaw, the plate 124 having a set normally away from the fixed plate 121. The two plates or jaws are rigidly secured to the gripper-head 122 by means of a screw 125. The head 122 is cut away so as to provide a recess to receive a rocking member 126 which is mounted on the head by means of a pivot pin 127 rigidly secured to the rocking member and adapted to turn in bearings of said head. The actuating toe of the rocking member 126 is adapted to bear on the movable jaw 124 for causing it to grip a minor member against fixed jaw 121.

Gripper shank 123 is provided with a fork 128 which has a pin 129 for establishing a pin-and-slot connection between the shank and a guide plate 130 which is fixed on the end of a non-rotatable but longitudinally movable push-bar 131. The push-bar 131 is operated in one direction from each advancing platen and is spring actuated in opposite direction. In other words, it is operated by and at the speed of each platen and is returned by its spring, or as fully shown and described in my said application for patent. The construction and arrangement is such and so timed that the gripper 120 begins to partake of a governing movement lateral of the direction of movement of the articles or envelopes by the conveyor just before the push bar commences to operate.

*Gripper movement governing mechanism.*

The details of this mechanism are more fully illustrated and described in said application No. 741,180 and just such of the parts thereof are shown and described herein as are required for properly associating the present mechanism with the prior mechanism.

Such mechanism comprises a cam 132 on the far end of each platen, which is adapted to bear upon a lever 133 mounted for movement in a horizontal plane, and which lever is actuated in a direction contrary to the cam by means of a leaf spring 134 rigidly fixed to the frame of the machine and having its free end bearing on a short arm of lever 133. The lever 133 is connected by means of a universal joint 135 with the lower end of an upwardly extending lever 136 which is fulcrumed by pivot 137 on a bracket 138 rigid with the frame of the machine. A link 139 is adjustably and pivotally connected with the upper end of the upwardly extending lever 136 and extends transversely across the path of movement of the platens as far as the normal position of the gripper, and is pivoted at that end to a pivot-block 140. Extending transversely of the gripper shank 123 and fixed at its inner end rigidly to a part of the machine is a stationary support and guide rod 141, the other end of which is held by a supporting arm 142, which is pivotally mounted at its lower end so that it may be adjusted for releasing the guide rod 141 or holding it in a rigid position. The guide rod 141 constitutes a support and guide for a sleeve 143 to which the pivot-block 140 is secured, and the said sleeve additionally supports a block 144 which carries a guide sleeve 145 for the gripper shank 123. The block 140, sleeve 143, block 144 and sleeve 145 constitute what may be termed the "shuttle" for controlling the gripper movement.

The gripper-movement governing mechanism with the handle-gripping and advancing mechanism produce on the gripper, as fully disclosed in my aforesaid application No. 741,180, combined movements, the resultant of which is substantially on a slant with respect to the line of travel of the articles or envelopes on the platens. The manner in which the co-operation and synchronization of the gripper-movement governing mechanism and the handle-gripping and advancing mechanism is accomplished will be briefly described in so far as parts are disclosed herein which are described in aforesaid application.

Referring to Fig. 15, the gripper 120 is shown in position for gripping a handle or minor member which is just about to be produced and cut off by the punching mechanism to be described. The gripper is shown in full lines in a position such that its open jaws may enclose and grasp one edge of a handle, while the dotted lines show the gripper as having moved towards the slit 103 in the envelope. Briefly described, this movement and the continued movement which carries the gripper into the position shown in full lines in Fig. 16 is accomplished through the medium of the push-bar 123 actuated from each passing platen and the cam 132 on each platen, which cam moves link 139 transversely of the machine, and the said two movements of the push-bar 123 and link 139 act on the shuttle, composed of blocks 140 and 144 and the sleeves 143 and 145, which serves to impart the necessary inward and rearward movement to the gripper. This combined movement causes the gripper to follow along with the objective envelope at the same speed, while at the same time the gripper carries the terminal of the handle into the slit of the said envelope until the handle is so far introduced into the slit as to arrive at the position shown in Fig. 16 in dotted lines. The manner in which the gripper is closed and opened will be described later on. It should be noted that just after the gripper 120 partakes of its movement, the handle will be severed from the strip of material by the punching mechanism, and the gripper mechanism and punching mechanism are so timed that the gripper will not commence to move with a handle until it has been completely formed and gripped.

Envelope buckling and slit opening means.

The special features of these means which are directly mounted upon the platens for conditioning the envelopes or sheet articles are not shown herein, but so much of the co-operating mechanism shown and described in my previous application No. 741,180, is shown and described as will facilitate a more ready comprehension of the present improvements. Referring more particularly to Figs. 1, 14, 15 and 16, a spring elevated, vertically movable, stem 146 is provided which is guided in a bracket 147 supported on the frame of the machine. Said stem 146 carries at its lower end a presser-foot 148 which is located so that the slitted portions of the envelopes will pass underneath it at the time that the handle is just about to enter the slit of an envelope. Foot 148 is provided with a toe 149 and with an inclined deflecting finger 150, which toe and finger serve to guide the terminal of a handle towards the slit of each envelope. Below the presser-foot there is fixed thereto a shoe 151 so that said shoe, together with the toe 149, will act in conjunction with the special features of each platen to buckle or deform the material of the envelope directly around its slit so as to open up the slit in order that the terminal of the handle may be introduced thereinto.

A toothed wheel 152 is mounted on one end of shaft 153 and the teeth thereof are adapted to engage the driving holes 89 in the platens, whereby said toothed wheel and shaft may be rotated. The shaft 153 is provided with two tappets 154 which are adapted to operate on a presser-foot depressing bar 155 with a view to depressing the presser-foot on to the envelope at the proper time. Bar 155 has adjustably mounted thereon a nose 156 with which the ends of the tappets directly engage for the purpose mentioned. As each fastening device or minor member or handle 157 for each envelope is being released from the gripper 120 said member or handle is simultaneously caught by a pressure roller 158 mounted upon the shaft 153, so that said roller 158 will roll the attaching portion of the handle on to the gummed portion of the flap of the envelope passing beneath said roller, whereby said handle is secured to the enevelope.

Gripper opening and closing means.

As the gripper of the present invention comprises jaws, one which is preferably positively movable in one direction to close the gripper and which has a self-movement to open it, timed means for accomplishing these functions are associated with the gripper, such means being fully shown in Figs. 4 and 14 to 17 inclusive. To this end a downwardly extending gripper-closing rod 160 is adjustably fixed at its upper end in a bracket 161 which extends from the punch to be described, so that at the downward movement of the punch the rod 160 will be reciprocated and brought into engagement with the outer end of the rocking member 126 on the gripper and thereby act to close the movable gripper jaw 124 upon the handle which is being or about to be severed from the strip.

Two abutments 162 are secured to the inner face of the pressure roller 158, said abutments being evenly spaced apart. These abutments extend toward the periphery of the roller 158, and at the moment that the gripper and its gripped handle arrive at the position shown in Fig. 16, one of the abutments 162 comes in contact with an arm 163 on the pivot pin 127 of the gripper. The result is that the rocking member 126 which actuates the movable gripper jaw 124 is rocked in such direction as to release its pressure from the jaw 124 so that said jaw will spring open, said parts being brought thereby from the full line position shown in Figs. 17 and 18 to the dotted line position shown therein. The gripper then returns from the position shown in Fig. 16 to the full line position shown in Fig. 15 and its jaws will be open so that the handle end of the paper strip may be fed thereinto.

Strip feeding and handle forming mechanism.

This mechanism is described in part in my aforesaid prior application No. 741,180, but certain of the prior parts as well as novel associated mechanism will be described herein with reference to Figs. 1, 2, 4, 14, 15, 16 and 20 to 26 inclusive.

Punch frame 164 is supported on bracket 166 at the gripper side of the machine, said bracket being fixed to frame 30. A fly wheel 167 is mounted on shaft 168 which is journaled in bearings of the punch frame 164 and on which is mounted a sprocket-wheel 169. Sprocket-wheel 169 is connected by chain 170 to a sprocket-wheel 171 which is mounted on the power shaft 40 of the machine, so that shaft 168 may be driven. A pitman 172 connects the shaft 168 with the main punch 173 which is guided in the frame 164 for the purpose of blanking out the handles and for making the finger holes therein.

A rigid support 174 extends horizontally from the punch frame 164 for the purpose of guiding the strip of paper 175 which is to be formed and cut up into handles. The strip 175 is supplied from a paper reel, not illustrated, and is guided under the male portions of the punch 173 and over the female die 176 for co-operation with the male die to form and punch out the handles from the strip 175. The strip support 174 has provided in its passageway guide strips 177 under which the edges of the paper strip 175 are guided.

A guide roll 178 is journaled in bearings of arms 179 mounted on pivots 180 on the support 174, and over said roll the paper strip 175 is guided. Rigidly fixed to the support 174 are plate springs 181, the free ends of which bear on the arms 179, so as to provide a yielding support for the paper guide roll 178. From the guide roll 178 the paper strip 175 is led through an adjustable guide 182 which comprises a fixed blade 183 and a movable blade 184, the strip passing between these blades, and the knife edges thereof extending oppositely to the direction of movement of the strip 175. Movable blade 184 is mounted loosely on pins 185 which are suspended from the fixed blade 183, while springs 186 are fixed between the blade 183 and the support 174, to which said blade and springs are rigidly secured. Springs 186 press on the movable blade 184. The movable blade 184 is provided with a handle 187 which is adapted to open the blade 184 away from blade 183, there being guide fingers 188 fixed to the blade 183 for the purpose of guiding the edges of the paper strip. Should a portion of the strip be torn or too thick for the making of a fairly good handle, the knife edges of the blades 183, 184, will produce a violent rupture of the strip, such that the attention of the attendant of the machine will be directed thereto, who may then stop the machine and thread the strip in between the said blades if necessary.

Paper strip 175 passes, from between the blades 183, 184, between a pair of feed rolls 189, 190 which are mounted on shafts 191, 192 journaled in suitable bearings carried by the support 174. Fixed on the shafts 191, 192 are gear wheels 193, 194 respectively which are in mesh with each other so that the rolls 189, 190 may be driven simultaneously. A pitman 195 is pivoted at one end to sprocket-wheel 169 and at the other end to a link or rocking member 196 which is mounted loosely on shaft 192. Ratchet wheel 197 is rigidly fixed to the shaft 192, its teeth being adapted to be engaged by pawl 198 which is pivoted on the link or rocking member 196, so that the rotation of the shaft 168 will cause the pitman 195 to rock the link 196, and cause the pawl and ratchet engagement resulting in turning the feed rolls 189 and 190.

An L-shaped arm 199 is rigidly and adjustably fixed by its long arm to the punch 173 and supports a plunger 200, the lower end of which carries a female die 201. The female die is composed of a member 202 secured directly to the plunger and to it there is secured another member 203, which is secured to member 202 by means of screws 204. The die member 201 is provided with tapering recesses 205 and although complementary recesses are not shown in the die member 203, such may be used, if necessary.

A cross piece 206 is secured rigidly to the support 174 and in it are secured punches 207 which have tapered ends 208 corresponding to the recesses 205 in the female die. When the paper strip is at rest between the male and female dies, shoulders 209 are struck up in the strip by the downward movement of the female die 201. The male die composed of the cross piece 206 and punches 207 is provided with a spring stripper 210 for an obvious purpose in the art.

A cross piece 211, shown more clearly in Fig. 14, is provided with a spring stripper 212 which is associated with the main punch 173, which is provided with a cutting edge 213 adapted to sever the shouldered and formed portion of the paper strip to provide a handle which is grasped by the gripper before described.

General features.

A toothed wheel 214 is mounted on shaft 215 so that its teeth may be in engagement with the driving holes 89 in the platens, said shaft being mounted on the frame of the machine to the rear of shaft 153. Printing or embossing members 216 are supported on shaft 215 for the purpose of printing, if desired, upon the handles of the successive handle envelopes as they pass to the rear from beneath the pressure roll 158.

As shown in Figs. 1 and 2, a pulley 217 is mounted on shaft 215 and is connected by an endless band 218 with a second pulley 219 which is rigid on shaft 220 at the discharge end of the machine, said shaft 220 being suitably supported on the frame of the machine. Mounted upon shaft 220 are heads 221 to which are attached flexible throw-off fingers 222, which are for the purpose of discharging the complete handle envelopes from the platens to any desired place.

Operation.

The operation will be but briefly described inasmuch as it is probably sufficiently clear from the preceding specification. The envelope bodies are delivered to the receiving end of the machine from a suitable source, as for instance from an envelope body-making machine, the envelopes being positioned one at a time on each approaching platen, with the gages of which each envelope is caused to register. Any envelope which is disqualified for use in the machine is detected and discarded by the detector-discarder, if a disqualified envelope happens to come along.

The envelopes are then slitted so as to produce the slits into which the terminals of the handles are afterwards moved, while the flaps of the envelopes have been suitably supplied with stripes of gum or paste. Then the qualified and gummed and slitted envelopes are passed along so that a handle which has been supplied from a suitable source, as for instance from a punching mechanism, and is gripped by the gripper may be moved by the gripper so as to introduce the terminal of the handle into the slit of an envelope. After this, the attaching members of the handles are pressed upon the gummed flaps of the envelopes, the handles printed, if desired, and the complete handle envelopes discharged from the machine by the throw-off fingers.

The punching mechanism will be seen to guide the paper strip towards a position such that its forward end may be grasped at one side by the gripper, but the punching takes place at intermittent intervals while the intermittently fed paper strip is at rest.

It will be seen that the shoulder or shoulders are first formed on the strip while it is at rest, that after a further movement of the strip sufficient for the length of a handle, the main punching devices strike out a portion of the strip in the form of a handle and form a finger hole therein, and that finally after another forward feed of the strip, the main punch starts to cut off a complete handle from it, which handle is simultaneously delivered to the gripper. The gripper then grasps the handle end of the strip and the handle is cut off completely.

It is obvious that the described and illustrated invention is susceptible to a wide range of modification and suitable changes will suggest themselves to those skilled in the art, it being understood that the invention is not restricted except as defined in the claims.

What I claim as new is:

1. The method herein described, including moving individual sheet articles, flattening and positioning those articles which are qualified for use in a subsequent operation, and positively engaging and removing those articles which are not flattened and are disqualified for use whether positioned or not.

2. The method herein described, including moving individual sheet articles from corresponding faces, pneumatically flattening from the opposite faces those articles which are qualified for use in a subsequent operation, and positively engaging and removing those articles which are not flattened and are disqualified for use.

3. The method herein described, including moving individual sheet articles, flattening those articles which are qualified for use in a subsequent operation, and pneumatically discharging those articles which are not flattened and are disqualified for use.

4. The method herein described, including moving individual sheet articles, appropriately positioning the articles when moving, flattening those articles which are qualified for use in a subsequent operation, and positively engaging and removing those articles which are not flattened and are disqualified for use.

5. The method herein described, including moving individual sheet articles, flattening those articles which are qualified for use in a subsequent operation, detecting and discarding those articles which are not flattened and are disqualified for use, and blowing away the discarded articles.

6. The method herein described, in association with a traveling endless chain of link platens for supporting sheet articles individually on the platens, which comprises the steps of moving flexible articles along a path and directing a current of air against the articles to tend to flatten them while they are in motion.

7. The method herein described, in association with a traveling endless chain of link platens for supporting sheet articles individually on the platens, including flattening on the platens those articles which are qualified for use in a subsequent operation, and removing from the platens those articles which are not flattened and are disqualified for use.

8. The method herein described, in association with a traveling endless chain of link platens for supporting sheet articles individually on the platens, including appropriately positioning the articles on the platens, flattening on the platens those articles which are qualified for use in a subsequent operation, and removing from the platens those articles which are not flattened and are disqualified for use.

9. The method herein described, in association with a traveling endless chain of link platens for supporting sheet articles individually on the platens, including flattening on the platens those articles which are disqualified for use, detecting and discarding those articles which are not flattened and are disqualified for use, and blowing the discarded articles away.

10. In a machine of the class described, the combination with means for feeding articles, of means for detecting the disqualified articles, and means to forcibly and positively catch on the edges of, and thereby to separate and discard, the disqualified articles.

11. In a machine of the class described, the combination with means for feeding articles, of means for detecting the disqualified articles, and means for continuously actuating the detecting means to cause the same to forcibly engage the edges of, and thereby to separate and discard the disqualified articles.

12. In a machine of the class described, the combination with means for uninterruptedly feeding articles, of movable detecting means, and means for continuously moving the detecting means to cause the same to forcibly discard detected disqualified articles from the feeding means.

13. In a machine of the class described, the combination with means for feeding articles, of a rotary detector for disqualified articles, and means for continuously rotating the detector in a path to cause it to intercept the disqualified articles as they protrude into such path and to remove them from the feeding means.

14. In a machine of the class described, the combination with means for feeding flexible sheet articles, of means for flattening those of the articles which will respond thereto, and means for detecting and positively engaging and discarding those of the articles which may be so deformed as not to respond thereto.

15. In a machine of the class described, the combination with means for feeding flexible sheet articles, of pneumatic means for flattening those of the articles which will respond thereto, and means for detecting and positively engaging and discarding those of the articles which may be so deformed as not to respond thereto.

16. In a machine of the class described, the combination with means for feeding flexible sheet articles, of pneumatic means for directing downward air currents onto the articles to tend to flatten them, and means for detecting and discarding those of the articles which may be so deformed as not to be flattened.

17. In a machine of the class described, the combination of a traveling endless chain comprising link-platens for supporting sheet articles, means for appropriately positioning the articles on the platens, means for detecting and discarding deformed articles, and means for removing the discarded articles.

18. In a machine of the class described, the combination of a traveling endless chain comprising link-platens for supporting sheet articles, gages at one edge and an adjacent edge of each platen, means for bringing each article against one edge gage, and means for bringing each article against the other edge gage.

19. In a machine of the class described, the combination of a traveling endless chain comprising link-platens for supporting sheet articles, gages at one edge and an adjacent edge of each platen, means for registering each article with the gages of each platen, and means for detecting and discarding deformed articles.

20. In a machine of the class described, the combination of means for feeding articles, a detector for disqualified articles, and comprising a rotatory toothed disk, and means for rotating the detector to cause its teeth to discard the disqualified articles.

21. In a machine of the class described, the combination of means for feeding articles, a detector for disqualified articles, and comprising a rotatory toothed disk, means for rotating the detector to cause its teeth to discard the disqualified articles, and guiding means associated with the detector.

22. In a machine of the class described, the combination of means for feeding articles, a detector for disqualified articles, and comprising a rotatory toothed disk, means for rotating the detector to cause its teeth to discard the disqualified articles, a spring guide finger, and means associated with the detector to restrict the movement of the guide finger.

23. In a machine of the class described, the combination of means for feeding articles, a detector for disqualified articles, and means for positively adjusting the detector to regulate the size of the throat between the detector and the feeding means, such adjusting means having means for laterally stabilizing the detector.

24. In a machine of the class described, the combination of a platen, a clamp co-operating therewith and having a contact-member of springy material connected therewith, and means acting on the contact-member to operate the clamp.

25. In a machine of the class described, the combination of a platen, a spring retracted clamp co-operating therewith and having a contact-member of springy material connected therewith, and means acting on the contact-member to operate the clamp.

26. In a machine of the class described, the combination of a platen, a clamp thereon having a leaf spring forming a contact-member, and means acting directly on the leaf spring to operate the clamp.

27. In a machine of the class described, the combination of a platen, clamping arms pivoted thereon, a bowed leaf spring connecting said arms, and means acting on the back of the bow to operate the clamp.

28. In a machine of the class described, the combination of a platen having gages, means for registering a sheet article with the gages, means for moving the platen, and means for securing the article upon the platen after it has been registered with the platen.

29. In a machine of the class described, the combination of a traveling endless chain composed of link-platens, means for imparting uninterrupted motion to the chain, gages on the platens, means for successively registering articles with the gages of the progressing platens, and means for then securing the articles to the platens successively.

30. In a machine of the class described, the combination of a plurality of traveling platens, clamps co-operating therewith, and control means for the successive actuation of the clamps thereby.

31. In a machine of the class described, the combination of a plurality of traveling platens, clamps co-operating therewith, and stationary camming means past which the platens travel for the successive actuation of the clamps thereby.

32. In a machine of the class described, the combination of a plurality of traveling platens, clamps thereon, and a stationary camming bar extending substantially parallel with the path of travel of the platens, whereby the clamps are successively actuated.

33. In a machine of the class described, the combination of a traveling platen, a clamp thereon, means for actuating the clamp, and means for releasing the clamp subsequent to its actuation.

34. In a machine of the class described the combination of a platen, means for securing an envelope thereto at its closed end, and means for applying a fastening device to the open end.

35. In a machine of the class described, the combination of a movable platen, means for securing an envelope thereto while the platen is in motion, and means for perforating the envelope while the platen is in motion.

36. In a machine of the class described, the combination of a platen, means for securing an envelope thereto at its closed end, means for transversely slitting the envelope in the vicinity of the open end, and means for inserting a handle into the slit.

37. In a machine of the class described, the combination of a traveling platen in uninterrupted motion, means for perforating in the vicinity of the open end of an envelope thereon, means for inserting a fastening device in the perforation, means for securing the fastening device to the envelope, means for securing the envelope to the platen previously to its being perforated and means for releasing the envelope after the securement of the fastening device.

38. In a machine of the class described, the combination of a plurality of traveling platens, envelope clamping means thereon, means for applying fastening devices to the envelopes, and means for holding the clamping means closed on the envelopes while the fastening devices are being applied.

39. In a machine of the class described, the combination of a plurality of traveling platens each having its own envelope clamping means, means for applying fastening devices to the envelopes in succession, and means for actuating the clamping means in succession previous to applying the fastening devices.

40. In a machine of the class described, the combination of a plurality of traveling platens each having its own envelope clamping means, means for applying fastening devices to the envelopes in succession, means for actuating the clamping means in succession previous to applying the fastening devices, and means for automatically releasing each clamping means.

41. The method herein described, including moving both qualified and disqualified articles of a given size in succession toward a point where minor members are to be applied to the qualified, discarding the disqualified, and applying the minor members to the qualified.

42. The method herein described, including discarding from uninterruptedly and progressively moving envelopes those which are disqualified, and applying minor members to the qualified envelopes while they are in motion.

43. The method herein described, including moving successive envelopes uninterruptedly toward a location where handles are to be attached thereto, detecting, intercepting and discarding each of the so moving envelopes which may have a defect such as to disqualify the envelope, and then attaching handles to be qualified envelopes.

44. The method herein described, including uninterruptedly moving successive envelopes of like size and structure, detecting, intercepting and discarding each of such, so moving, envelopes as may be so deformed as to be likely to interrupt the proper continuity of operations on the envelopes and continuing the uninterrupted movement past a location where handles are to be attached to the remaining envelopes, and attaching handles to the remaining envelopes, while they are moving past such location.

45. The method herein described, including flattening individual sheet articles, and while the articles are in motion positively engaging and removing each of them which may have such defect as to be incapable of sufficiently flattening for subsequent manipulation.

46. The method herein described, including smoothing individual sheet-paper articles which are substantially unrumpled, and detecting and positively engaging and removing such of them as may be rumpled and unfit for subsequent manipulation.

47. In a machine of the class described, the combination of a platen, a gripper comprising jaws for applying a minor member to an article on the platen, reciprocating means for closing the jaws on the minor member, and rotary means for opening the jaws.

48. In a machine of the class described, the combination of a platen, a gripper comprising jaws for applying a minor member to an article supported on the platen, means for forming a minor member for delivery to the gripper, means for closing the gripper-jaws from the forming means, and means for opening the jaws.

49. In a machine of the class described, the combination of a platen, a gripper comprising jaws for applying a minor member to an article supported on the platen, means for delivering a minor member to the gripper jaws, means associated with the delivering means for closing the jaws, and means for opening the jaws.

50. In a machine of the class described, the combination of means for forming members in succession, a gripper for receiving each member therefrom, means operated by the forming means for closing the gripper upon each member when formed, and means for operating the gripper to apply each member to an article.

51. In a machine of the class described, the combination of means for forming members in succession, a gripper for receiving each member therefrom, means for closing the gripper upon each member when formed, means for opening the gripper so that the member may be withdrawn, means operating the opening means and for withdrawing the member, and means for operating the gripper to apply each member to an article.

52. In a machine of the class described, the combination of means for striking out a shoulder from a relatively large portion of sheet material, and means for forming a handle from the said portion.

53. In a machine of the class described, the combination of means for striking out a shoulder from a relatively large portion of sheet material, and means for subsequently forming a handle from said portion.

54. In a machine of the class described, the combination of means for feeding a strip of sheet material, means for striking out successive shoulders from the strip, and means for forming successive handles from the shouldered portions of the strip and for forming finger holes in said portions.

55. In a machine of the class described, the combination of means for intermittently feeding a strip of sheet material, intermittently operable means for striking out successive shoulders from the strip, and intermittently operable means for forming successive handles from the shouldered portions of the strip and for forming finger holes in said portions.

56. In a machine of the class described, the combination of means for intermittently feeding a strip of sheet material, intermittently operable means for striking out successive shoulders from the strip, and intermittently operable means for forming successive handles from the shouldered portions of the strip and for forming finger holes in said portions, the forming means operable on the shoulder striking means.

57. In a machine of the class described, the combination of means for intermittently feeding a strip of sheet material, and mechanism for operating on the strip during successive stops thereof, comprising means for first forming a shoulder in a length of the strip, means for then forming a handle portion from the shouldered length of the strip, and means for then cutting off said handle portion to provide a handle.

58. The method herein described, which comprises striking out a shoulder from a relatively large portion of a strip, and then producing a handle from said relatively large portion.

59. The method herein described, which comprises intermittently feeding a strip, intermittently striking out successive shoulders from the strip, and intermittently producing handles from the shouldered portions of the strip.

60. The method herein described, which comprises intermittently feeding a strip, forming a shoulder in a length of the strip during a stop thereof, forming a handle portion from the shouldered length of the strip during a second stop thereof, and cutting off said handle portion to provide a handle during a third stop thereof.

GEORGE C. SNYDER.